United States Patent
Nishimura et al.

(10) Patent No.: US 8,559,111 B2
(45) Date of Patent: Oct. 15, 2013

(54) INTERFERENCE FILTER HAVING ADHESIVE AND WARP REDUCTION GROOVES

(75) Inventors: Teruyuki Nishimura, Matsumoto (JP); Akira Sano, Shiojiri (JP)

(73) Assignee: Seiko Epson Corporation (JP)

(*) Notice: Subject to any disclaimer, the term of this patent is extended or adjusted under 35 U.S.C. 154(b) by 401 days.

(21) Appl. No.: 12/887,596

(22) Filed: Sep. 22, 2010

(65) Prior Publication Data

US 2011/0128549 A1   Jun. 2, 2011

(30) Foreign Application Priority Data

Nov. 30, 2009  (JP) .................................. 2009-271234

(51) Int. Cl.
    *G02B 27/00*   (2006.01)
(52) U.S. Cl.
    USPC ............ 359/578; 359/577; 356/454; 356/519
(58) Field of Classification Search
    USPC .................................................. 359/578, 579
    See application file for complete search history.

(56) References Cited

U.S. PATENT DOCUMENTS

| | | | |
|---|---|---|---|
| 6,785,052 B2 * | 8/2004 | Ockenfuss et al. | 359/589 |
| 7,483,211 B2 * | 1/2009 | Nakamura et al. | 359/579 |
| 2003/0016447 A1 | 1/2003 | Kato et al. | |
| 2007/0242358 A1 * | 10/2007 | Lin et al. | 359/578 |
| 2007/0242920 A1 * | 10/2007 | Lin et al. | 385/27 |

FOREIGN PATENT DOCUMENTS

| | | |
|---|---|---|
| JP | 10-031142 | 2/1998 |
| JP | 2000-056199 A | 2/2000 |
| JP | 2003-294937 A | 10/2003 |
| JP | 2009-134027 | 6/2009 |
| JP | 2009-244498 A | 10/2009 |
| JP | 2009-251105 A | 10/2009 |

* cited by examiner

*Primary Examiner* — Arnel C Lavarias
(74) *Attorney, Agent, or Firm* — Harness, Dickey & Pierce, P.L.C.

(57) ABSTRACT

An interference filter includes: a first substrate; a second substrate that faces one side of the first substrate and is bonded to the first substrate; a first reflection film formed on the side of the first substrate that faces the second substrate; and a second reflection film provided on the second substrate and faces the first reflection film, the first substrate including a first gap formation region in which the first reflection film is disposed and which is not contact with the second substrate, and wherein the first substrate and the second substrate are adhesively bonded to each other with the adhesive applied into the adhesive grooves with the first bonding region and the second bonding region bonded to each other.

8 Claims, 10 Drawing Sheets

FIG. 8A
FIG. 8B
FIG. 8C
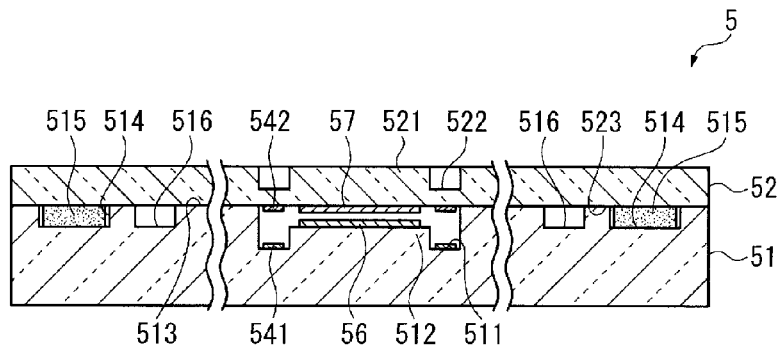
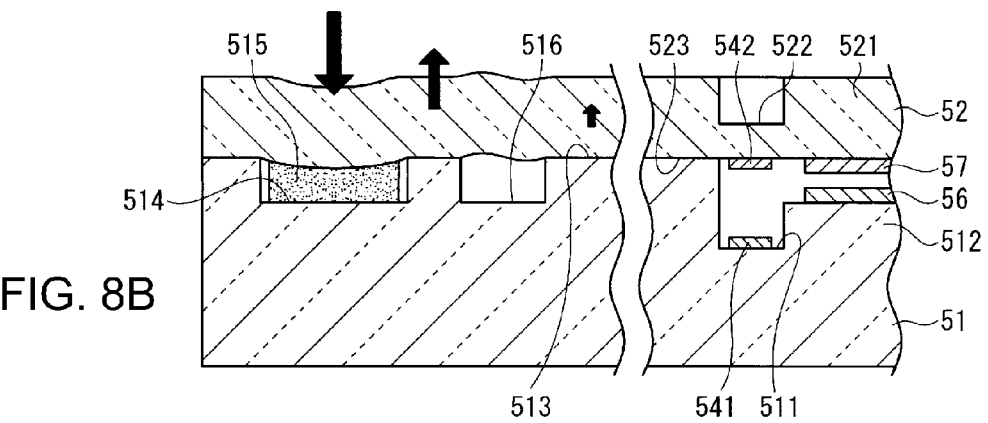
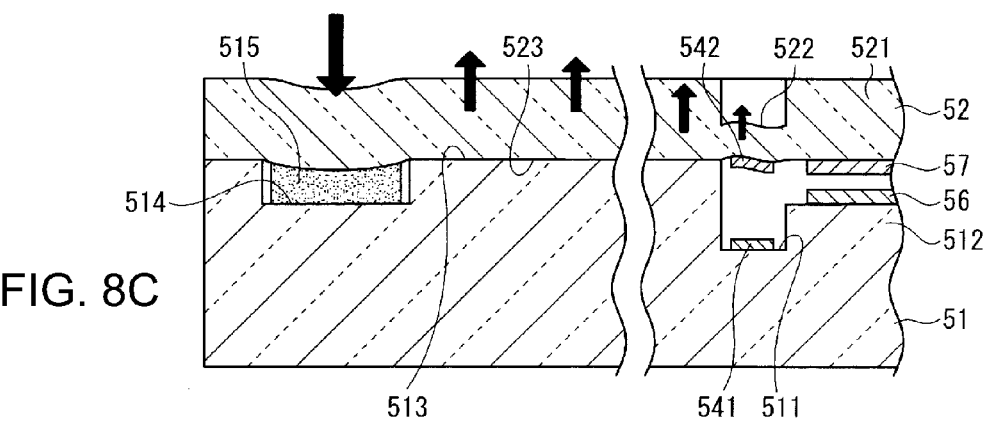

INTERFERENCE FILTER HAVING ADHESIVE AND WARP REDUCTION GROOVES

The entire disclosure of Japanese Patent Application No. 2009-271234, filed Nov. 30, 2009 is expressly incorporated by reference herein.

BACKGROUND

1. Technical Field

The present invention relates to an interference filter that separates light of a predetermined wavelength from incident light, an optical sensor including the interference filter, and an optical module including the optical sensor.

2. Related Art

There have been known interference filters that transmit or reflect only a predetermined wavelength light from incident light (see JP-A-2009-134027, for example).

JP-A-2009-134027 describes an optical device (interference filter) having a pair of substrates facing each other and having reflection films formed on the surfaces of the substrates that face each other. In the interference filter of this type, a gap is formed between the pair of reflection films, and the dimension of the gap determines the wavelength of light that can be separated.

In the interference filter of this type, it is necessary to maintain the pair of reflection films parallel to each other in order to separate light of a predetermined wavelength with spectral precision. For example, when the substrates are bonded to each other by forming an adhesive layer formed of an adhesive between the substrates, it is disadvantageously difficult to control the thickness of the adhesive layer and hence difficult to maintain the reflection films parallel to each other.

To address the problem, it is conceivable to employ a bonding method for bonding the substrates by forming an adhesive groove into which an adhesive is applied in a bonding surface across which the substrates are bonded and applying an adhesive into the adhesive groove.

When the adhesive applied into the adhesive groove is used to bond the substrates to each other as described above, however, volume shrinkage that occurs when the adhesive hardens induces stress in the adhesive applied portion and the stress warps the substrates.

For example, consider a case where a first substrate and a second substrate are bonded to each other with an adhesive by forming an adhesive groove into which an adhesive is applied in the second substrate, applying an adhesive into the adhesive groove, and overlaying the first substrate on the second substrate so that the groove is closed. When the adhesive hardens and shrinks, induced stress warps the first substrate toward the adhesive groove. When the first substrate warps into the adhesive groove, the balance among the forces acting on the entire first substrate becomes unstable. As a result, the pair of reflection films cannot disadvantageously be maintained parallel to each other. When the pair of reflection films are not maintained parallel to each other, the wavelength of separated light varies depending on the position in the reflection films. For example, separated light passing through a portion where the gap is large has a long wavelength, whereas separated light passing through a portion where the gap is small has a short wavelength. The spectral precision of the interference filter is therefore disadvantageously poor.

SUMMARY

An advantage of some aspects of the invention is to provide an interference filter, an optical sensor, and an optical module having high spectral precision.

An interference filter according to a first aspect of the invention includes a first substrate, a second substrate that faces one side of the first substrate and is bonded to the first substrate, a first reflection film formed on the side of the first substrate that faces the second substrate, and a second reflection film provided on the second substrate and faces the first reflection film. The first substrate includes a first gap formation region in which the first reflection film is disposed and which is not contact with the second substrate and a first bonding region provided outside the first gap formation region and in contact with the second substrate. The second substrate includes a second gap formation region in which the second reflection film is disposed and which faces the first gap formation region with a gap therebetween, a second bonding region provided outside the second gap formation region and in contact with the first bonding region of the first substrate, adhesive grooves which are formed in the second bonding region and into which an adhesive is applied, and warp reduction grooves formed between the adhesive grooves and the second gap formation region. The first substrate and the second substrate are adhesively bonded to each other with the adhesive applied into the adhesive grooves with the first bonding region and the second bonding region bonded to each other.

In the first aspect of the invention, the first substrate and the second substrate are adhesively bonded to each other by abutting the first bonding region of the first substrate and the second bonding region of the second substrate and applying an adhesive into the adhesive grooves formed in the second bonding region. Since the adhesive applied into the adhesive grooves shrinks when it hardens, stress oriented toward the second substrate (the stress is herein referred to as adhesive shrinkage stress) acts on the portions of the first substrate that face the adhesive grooves. In the first aspect of the invention, since the warp reduction grooves are formed in the second bonding region of the second substrate between the adhesive grooves and the second gap formation region, a warp of the first substrate produced by the adhesive shrinkage stress is not constrained but goes into the warp reduction grooves. Therefore, the first gap formation region of the first substrate will not warp.

That is, the adhesive compressive stress warps the portions of the second substrate that face the adhesive grooves in the first substrate (adhesively bonded portions) into the adhesive grooves, and a reaction force that attempts to correct the warp (the reaction force is herein referred to as a warp reaction force) is induced in the first substrate.

If no warp reduction groove is formed, the warp reaction force is transferred to the boundary between the first bonding region and the first gap formation region where the first substrate and the second substrate is not in contact with each other, and the first gap formation region may warp in some cases so that the first substrate returns back to its original state against the warp reaction force. In this case, the first gap formation region and the second gap formation region are not parallel to each other, and the first reflection film and the second reflection film are not maintained parallel to each other accordingly.

To address the problem, the warp reduction grooves are formed in the second substrate. When the adhesively bonded portions of the first substrate warp toward the adhesive groove, the warp reaction force warps the regions of the first substrate that faces the warp reduction grooves so that the balance among the forces acting on the first substrate returns to its original state. Therefore, when the first substrate warps into the warp reduction grooves, the warp reaction force induced by the hardened adhesive described above can be released, whereby the magnitude of the warp reaction force transferred to the first gap formation region can be reduced. As a result, the balance among the forces in the first gap formation region can be stable, and the first gap formation region and the second gap formation region and hence the first reflection film and the second reflection film are maintained parallel to each other. As a result, the spectral precision of the interference filter can be improved.

In the interference filter according to the first aspect of the invention, the first bonding region and the second bonding region are preferably optical surfaces, and the first substrate and the second substrate are preferably not only bonded to each other by optical contact between the first bonding region and the second bonding region but also adhesively bonded with the adhesive applied into the adhesive grooves.

In the first aspect of the invention, the first substrate and the second substrate are bonded to each other not only by optical contact but also by adhesive bonding using an adhesive. Since the optical contact allows the first substrate and the second substrate to come into intimate contact with each other, the first substrate and the second substrate can be maintained parallel to each other with more precision. Although only the optical contact may pose a problem in terms of bonding strength, the bonding strength can be increased by concurrently using the adhesive bonding. Using the bonding method described above therefore allows the first substrate and the second substrate to be bonded to each other strongly with the first gap formation region and the second gap formation region maintained parallel to each other with more precision.

In the interference filter according to the first aspect of the invention, each of the warp reduction grooves is preferably disposed in a position spaced apart from the center between a gap-facing peripheral edge and a groove-facing peripheral edge but close to the corresponding one of the adhesive grooves. The gap-facing peripheral edge herein is the portion of the peripheral edge of the adhesive groove that faces the second gap formation region, and the groove-facing peripheral edge herein is the portion of the peripheral edge of the second gap formation region that faces the adhesive groove.

The gap-facing peripheral edge refers to an inner portion of each of the adhesive grooves, that is, the straight or curved portion of the adhesive groove that is closest to the second gap formation region in a plan view showing the second substrate in the substrate thickness direction. The groove-facing peripheral edge refers to the straight or curved portion of the peripheral edge of the second gap formation region that is closest to the gap-facing peripheral edge.

In the first aspect of the invention, each of the warp reduction grooves is disposed in a position close to the corresponding adhesive groove but away from the second gap formation region. The configuration allows stress induced by shrinkage of the adhesive to be released more reliably into the warp reduction grooves. It is therefore possible to prevent inconvenience in which stress acts on the first gap formation region.

That is, when the first substrate warps toward the adhesive grooves, the magnitude of the warp reaction force transferred to the first gap formation region decreases because the first substrate warps toward the warp reduction grooves, but the first substrate having warped into the warp reduction grooves produces a slight reaction force in the first bonding region between the warp reduction grooves and the first gap formation region. If each of the warp reduction grooves is disposed in a position close to the second gap formation region, the slight reaction force described above is conceivably transferred to the first gap formation region and warps the first gap formation region and makes the balance among the forces in the first gap formation region unstable. To address the problem, forming each of the warp reduction grooves in a position close to the corresponding adhesive groove prevents the slight reaction force described above from being transferred to the first gap formation region but allows the balance among the forces in the first gap formation region to be stable. Therefore, the first reflection film and the second reflection film can be maintained parallel to each other with more precision, and the spectral precision of the interference filter can be further improved.

In the interference filter according to the first aspect of the invention, each of the warp reduction grooves is preferably disposed in an inter-groove-gap region surrounded by the gap-facing peripheral edge, which is the portion of the peripheral edge of the corresponding adhesive groove that faces the second gap formation region, and the groove-facing peripheral edge, which is the portion of the peripheral edge of the second gap formation region that faces the adhesive groove.

When the first substrate warps into the adhesive grooves, the stress induced by the warp is transferred from the portions of the first substrate that are in contact with the gap-facing peripheral edges of the adhesive grooves toward the first gap formation region. Forming the warp reduction grooves in the inter-groove-gap regions, each of which is surrounded at least by the corresponding gap-facing peripheral edge and groove-facing peripheral edge, allows the adhesive shrinkage stress induced when the adhesive hardens to be sufficiently released. Further, the area across which the first bonding region and the second bonding region are bonded to each other and hence the bonding strength can be increased by forming an extra second bonding region in the region outside the inter-groove-gap regions without forming the warp reduction grooves therein.

In the interference filter according to the first aspect of the invention, the warp reduction groove in each of the inter-groove-gap regions preferably includes a plurality of warp reduction grooves along the corresponding gap-facing peripheral edge.

The warp reduction groove in each of the inter-groove-gap regions may be a single longitudinal groove formed along the corresponding gap-facing peripheral edge, or a plurality of warp reduction grooves may be provided along the gap-facing peripheral edge. In the latter case, a force produced when the adhesively bonded portions warp into the adhesive grooves and acting on the first substrate can be sufficiently reduced. Forming a plurality of warp reduction grooves as described above allows extra second bonding regions to be created between the warp reduction grooves, whereby the area across which the first bonding region and the second bonding region are bonded to each other and hence the bonding strength can be increased.

In the interference filter according to the first aspect of the invention, each of the first substrate and the second substrate preferably has a rectangular shape in a plan view, and the adhesive grooves and the warp reduction grooves are preferably formed in the vicinities of the four corners of the rectangular shape of the second substrate.

In the first aspect of the invention, when each of the first substrate and the second substrate has a rectangular shape in a plan view, and the first gap formation region and the second gap formation region are formed in central portions of the first substrate and the second substrate, respectively, the adhesive grooves are formed at the four corners of the rectangular second substrate. That is, when each of the first substrate and the second substrate has a rectangular shape, the four corners of the rectangular shape are most remote from the first gap formation region and the second gap formation region. When the adhesive grooves are disposed at the four corners, a force produced when the first substrate warps toward the adhesive grooves is unlikely transferred to the first gap formation region. It is therefore possible to prevent the first gap formation region from warping more reliably.

An optical sensor according to a second aspect of the invention includes the interference filter described above and a light receiver for receiving light separated by the interference filter.

In the second aspect of the invention, since the amount of warp of the first gap formation region in the first substrate of the interference filter can be reduced as described above, the interference filter can separate light of a desired wavelength with spectral precision. Therefore, in the optical sensor including the interference filter described above, the light receiver can receive light separated by the interference filter, which excels in spectral precision, whereby the amount of received light of the desired wavelength can be accurately measured.

An optical module according to a third aspect of the invention includes the optical sensor described above and a processor for analyzing light separated by the interference filter based on the amount of light received by the light receiver.

In the third aspect of the invention, the analysis can be made based on the accurate amount of received light detected by the optical sensor. It is therefore possible to accurately analyze the light incident on the interference filter.

BRIEF DESCRIPTION OF THE DRAWINGS

The invention will now be described with reference to the accompanying drawings, wherein like numbers reference like elements.

FIGS. 8A to 8C are cross-sectional views of the etalon obtained by bonding the fixed substrate and the movable substrate of the first embodiment and describe an advantageous effect of warp reduction grooves.

DESCRIPTION OF EXEMPLARY EMBODIMENTS

First Embodiment

A colorimetry module as an optical module of a first embodiment according to the invention will be described below with reference to the drawings.

1. Overall Configuration of Colorimetry Module

Figure 1:
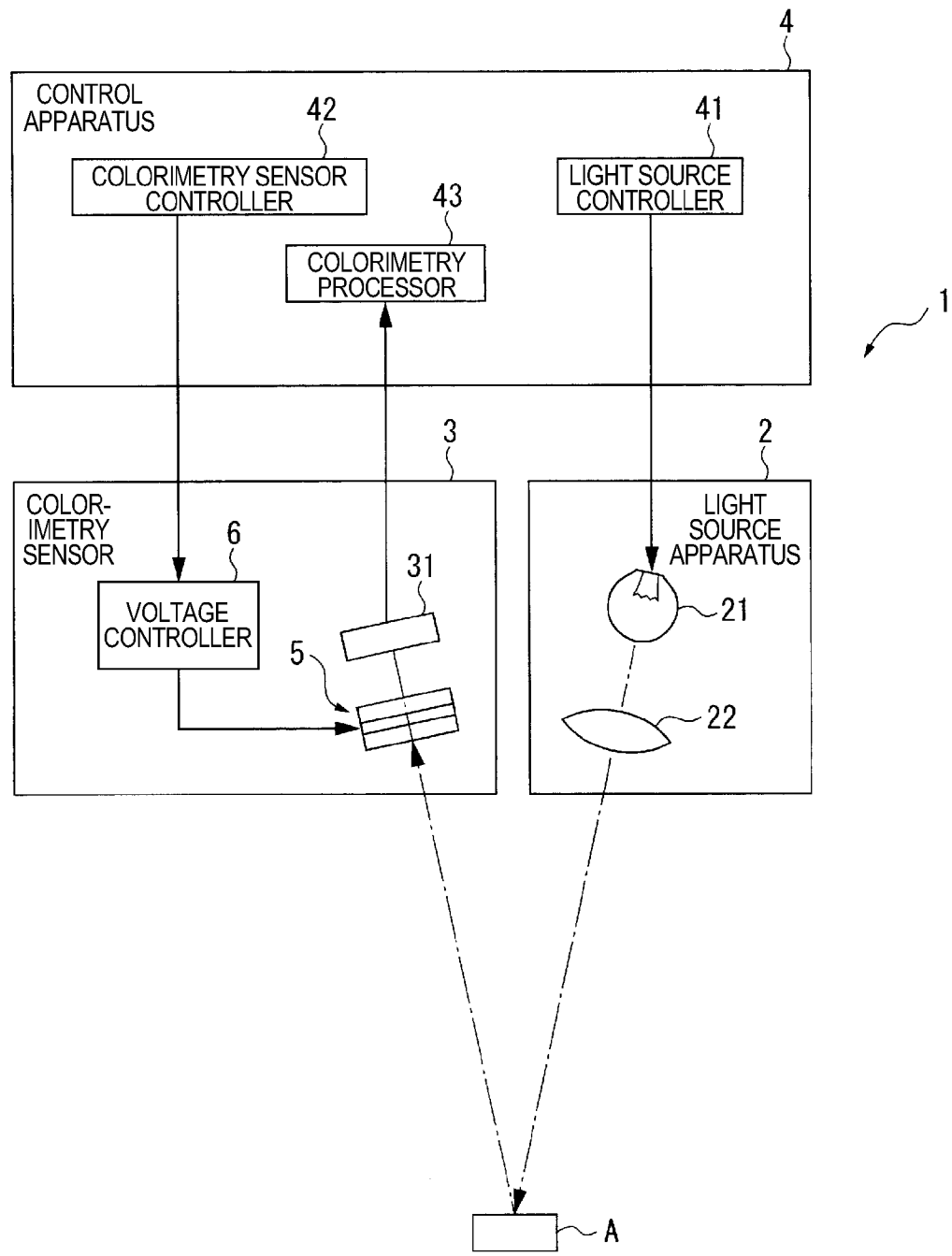
FIG. 1 shows a schematic configuration of a colorimetry module of a first embodiment according to the invention.

FIG. 1 shows a schematic configuration of the colorimetry module of the first embodiment according to the invention.

The colorimetry module 1 includes a light source apparatus 2 that emits light toward an object to be inspected A, a colorimetry sensor 3, which is an optical sensor according to the invention, and a control apparatus 4 that controls the overall action of the colorimetry module 1, as shown in FIG. 1. When the object to be inspected A reflects the light emitted from the light source apparatus 2 and the colorimetry sensor receives the reflected light to be inspected, the colorimetry module 1 analyzes and measures the chromaticity of light to be inspected, that is, the color of the object to be inspected A based on a detection signal outputted from the colorimetry sensor 3.

2. Configuration of Light Source Apparatus

The light source apparatus 2 includes alight source 21 and a plurality of lenses 22 (only one lens is shown in FIG. 1) and emits white light toward the object to be inspected A. The plurality of lenses 22 includes a collimator lens. In the light source apparatus 2, the white light emitted from the light source 21 is collimated through the collimator lens, and the collimated light exits through a projection lens (not shown) toward the object to be inspected A.

3. Configuration of Colorimetry Sensor

The colorimetry sensor 3 includes an etalon 5 that forms an interference filter according to the invention, a light receiving device 31 as a light receiver for receiving the light having passed through the etalon 5, and a voltage controller 6 for changing the wavelength of the light that the etalon 5 transmits, as shown in FIG. 1. The colorimetry sensor 3 further includes a light incident-side optical lens (not shown) that faces the etalon 5 and guides the light reflected off the object to be inspected A (light to be inspected) into the colorimetry sensor 3. In the colorimetry sensor 3, the etalon 5 separates light of a predetermined wavelength from the light to be inspected having been incident through the light incident-side optical lens, and the light receiving device 31 receives the separated light.

The light receiving device 31 is formed of a plurality of photoelectric conversion elements and produces an electric signal according to the amount of received light. The light receiving device 31 is connected to the control apparatus 4 and outputs the produced electric signal as a received light signal to the control apparatus 4.

3-1. Configuration of Etalon

Figure 2:
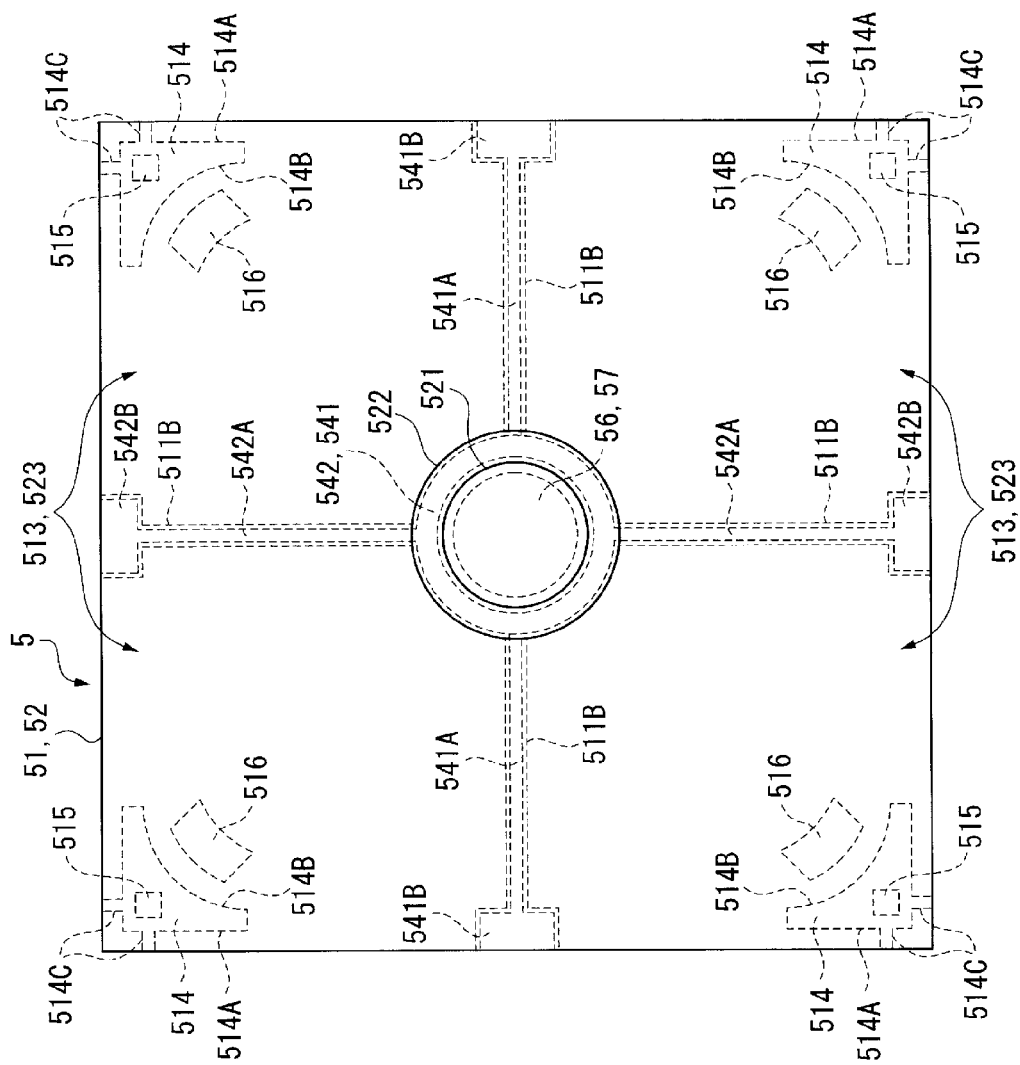
FIG. 2 is a plan view showing a schematic configuration of an etalon of the first embodiment.
Figure 3:
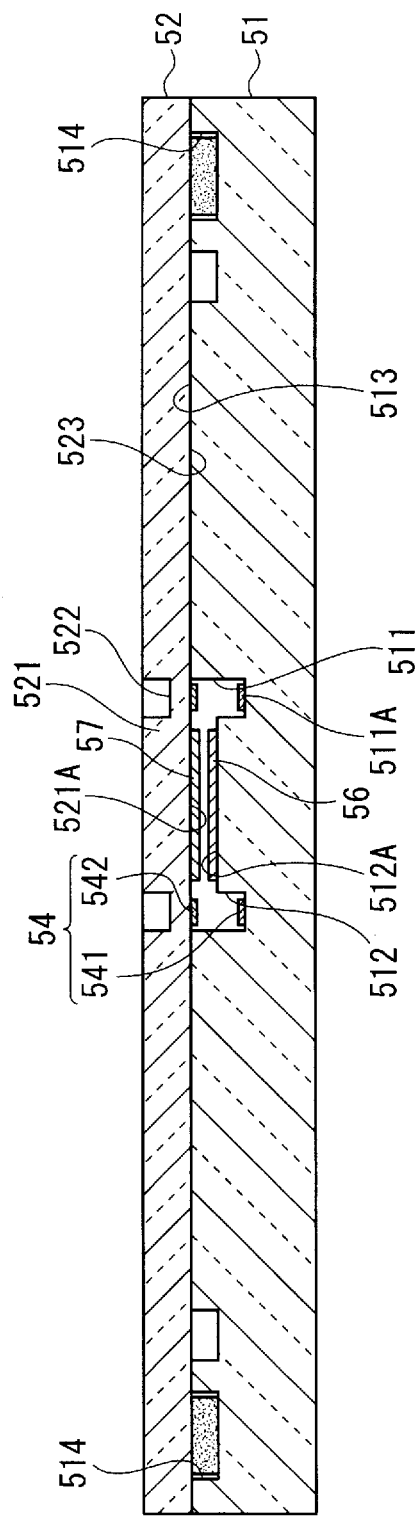
FIG. 3 is a cross-sectional view of the etalon of the first embodiment.

FIG. 2 is a plan view showing a schematic configuration of the etalon 5, which forms a tunable interference filter according to the invention. FIG. 3 is a cross-sectional view showing another schematic configuration of the etalon 5. It is noted that the light to be inspected is oriented upward and incident on the etalon 5 in FIG. 1, whereas the light to be inspected is oriented downward and incident on the etalon 5 in FIG. 3.

The etalon 5 is a plate-like optical member having a square shape in a plan view, and each side of the etalon 5 is sized to be 20 mm or any other suitable value, as shown in FIG. 2. The etalon 5 includes a fixed substrate 51, which is a second substrate, and a movable substrate 52, which is a first substrate, as shown in FIG. 3. The two substrates 51 and 52 are made of soda glass, crystalline glass, quartz glass, lead glass, potassium glass, borosilicate glass, no-alkali glass, or any other variety of glass materials, or crystal. Among them, the substrates 51 and 52 are preferably made of glass containing sodium (Na), potassium (K), or any other alkali metal. The substrates 51 and 52 made of any of the glass materials described above allow reflection films 56 and 57 and electrodes, which will be described later, to come into more intimate contact with the substrates and the substrates themselves to be more strongly bonded to each other. The two substrates 51 and 52 are integrated with each other by bonding a bonding surface 513 to a bonding surface 523, which are formed in the vicinities of peripheral portions of the substrates.

A fixed reflection film 56, which is a second reflection film according to the invention, and a movable reflection film 57, which is a first reflection film according to the invention, are provided between the fixed substrate 51 and the movable substrate 52. The fixed reflection film 56 is fixed onto the surface of the fixed substrate 51 that faces the movable substrate 52, and the movable reflection film 57 is fixed onto the surface of the movable substrate 52 that faces the fixed substrate 51. The fixed reflection film 56 and the movable reflection film 57 face each other with an inter-reflection film gap therebetween.

Further, an electrostatic actuator 54 for adjusting the dimension of the inter-reflection film gap between the fixed reflection film 56 and the movable reflection film 57 is provided between the fixed substrate 51 and the movable substrate 52.

3-1-1. Configuration of Fixed Substrate

Figure 4:
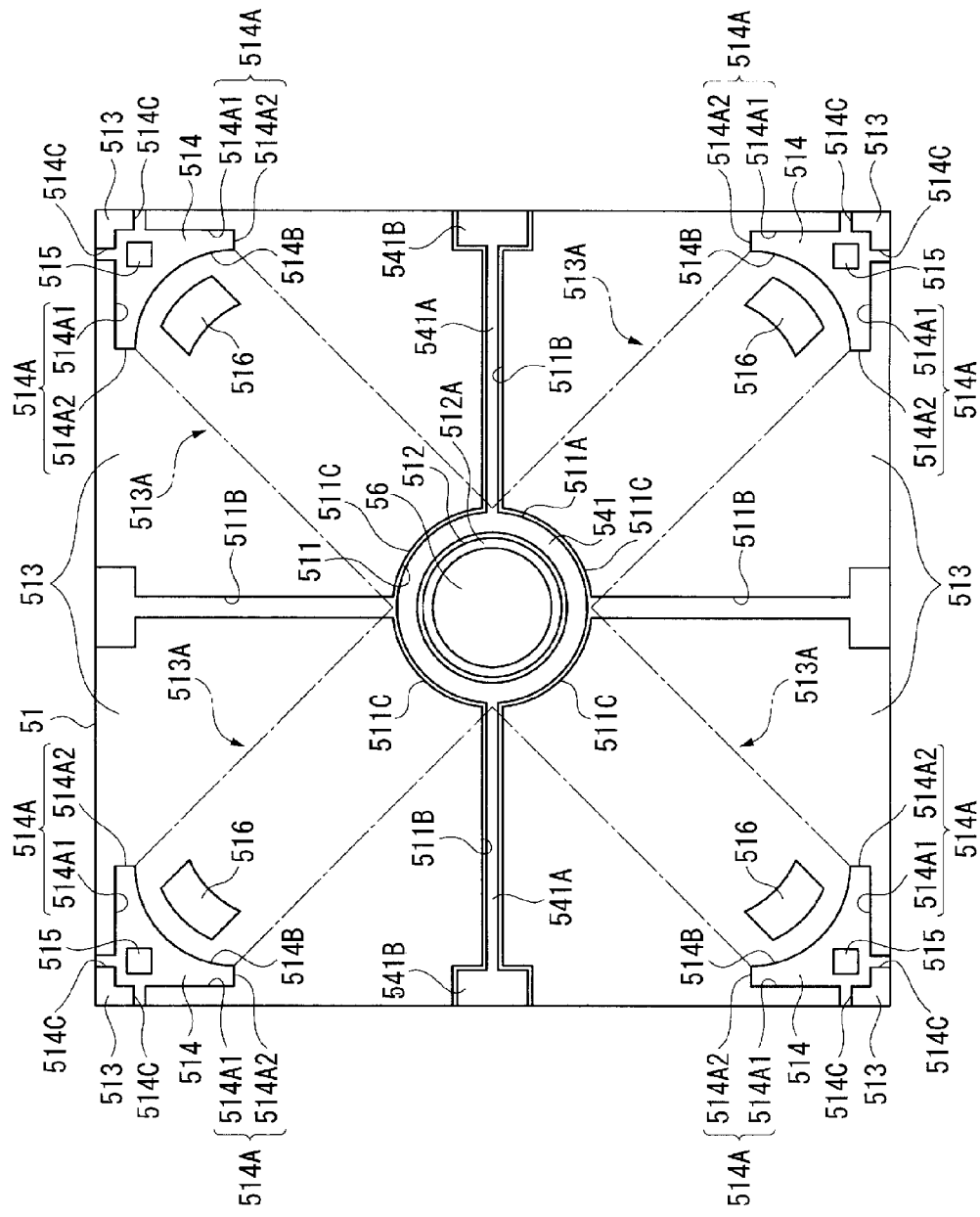
FIG. 4 is a plan view of a fixed substrate of the first embodiment.

FIG. 4 is a plan view of the fixed substrate 51 in a plan view viewed in the thickness direction of the etalon 5 (etalon plan view).

The fixed substrate 51 is formed by etching a glass base having a substantially square shape and a thickness of 500 μm or any other suitable value. Specifically, the fixed substrate 51 has an electrode formation groove 511, a reflection film fixing portion 512, adhesive grooves 514, and warp reduction grooves 516 formed in an etching process, as shown in FIGS. 3 and 4. In the fixed substrate 51 of the present embodiment, the electrode formation groove 511 and the reflection film fixing portion 512 form a second gap formation region according to the invention, and the fixed-side bonding surfaces 513, each of which form a second bonding region according to the invention, are formed outside the electrode formation groove 511.

The electrode formation groove 511 has a circular shape around the center of the plane of the etalon and a diameter of 5 mm or any other suitable value in the etalon plan view shown in FIG. 4. The reflection film fixing portion 512 protrudes from a central portion of the electrode formation groove 511 toward the movable substrate 52 in the plan view described above.

The electrode formation groove 511 has a ring-shaped electrode fixing surface 511A formed between the outer circumferential edge of the reflection film fixing portion 512 and the inner circumferential wall of the electrode formation groove 511, and a fixed-side electrode 541 is formed on the electrode fixing surface 511A.

The fixed substrate 51 further has an extension formation groove 511B extending from the outer circumferential edge of the electrode formation groove 511 toward the center of each of the four sides of the square fixed substrate 51 and having the same depth as that of the electrode fixing surface 511A, as shown in FIG. 4. Among the four extension formation grooves 511B, a pair of extension formation grooves 511B located on opposite sides of the electrode formation groove 511 (the extension formation grooves 511B disposed on the right and left sides in FIG. 4 in this embodiment) have fixed-side extended electrodes 541A formed thereon. The fixed-side extended electrodes 541A are extensions from the fixed-side electrode 541. Further, a fixed-side electrode pad 541B is formed at the tip of each of the fixed-side extended electrodes 541A, and the fixed-side electrode pad 541B is connected to the voltage controller 6.

To drive the electrostatic actuator 54, the voltage controller 6 applies a voltage to only one of the pair of fixed-side electrode pads 541B. The other one of the fixed-side electrode pads 541B is used as a detection terminal for detecting the amount of charge held by the fixed-side electrode 541.

The reflection film fixing portion 512 has a cylindrical shape that is coaxial with the electrode formation groove 511, as described above, and has a diameter smaller than that of the electrode formation groove 511. In the present embodiment, a reflection film fixing surface 512A of the reflection film fixing portion 512 faces the movable substrate 52 and is closer to the movable substrate 52 than the electrode fixing surface 511A is, as shown in FIG. 3, but the configuration described above is not necessarily employed, because the positional relationship between the electrode fixing surface 511A and the reflection film fixing surface 512A in the height direction is determined as appropriate in accordance with the dimension of the inter-reflection film gap between the fixed reflection film 56 fixed onto the reflection film fixing surface 512A and the movable reflection film 57 formed on the movable substrate 52, the dimension between the fixed-side electrode 541 and a movable-side electrode 542, which will be described later, formed on the movable substrate 52, and the thicknesses of the fixed reflection film 56 and the movable reflection film 57. For example, when each of the reflection films 56 and 57 is formed of a dielectric multilayer reflection film, which has a larger thickness, the electrode fixing surface 511A and the reflection film fixing surface 512A may be flush with each other, or a reflection film fixing groove having a cylindrically concave shape may be formed in a central portion of the electrode fixing surface 511A and the reflection film fixing surface 512A may be formed at the bottom of the reflection film fixing groove.

The fixed reflection film 56 having a circular shape and a diameter of approximately 3 mm is fixed onto the reflection film fixing surface 512A. The fixed reflection film 56 is formed of an AgC monolayer and formed on the reflection film fixing surface 512A, for example, in a sputtering process.

The present embodiment will be described with reference to, but not limited to, a case where a reflection film formed of an AgC monolayer, which can be used with the etalon 5 to separate light of a desired wavelength within the entire visible wavelength range, is used as the fixed reflection film 56. For example, a $TiO_2$—$SiO_2$-based dielectric multilayer reflection film may alternatively be used. In this case, the wavelength band from which the etalon 5 can separate a desired wavelength is narrower, but the transmittance to the separated light is higher than those of an AgC monolayer reflection film. In addition to these, the width at half maximum of the transmittance is narrow and the resolution is excellent. In the case of the $TiO_2$—$SiO_2$-based dielectric multilayer reflection film, however, the positional relationship between the reflection film fixing surface 512A and the electrode fixing surface 511A in the fixed substrate 51 in the height direction needs to be determined as appropriate in accordance with the fixed reflection film 56, the movable reflection film 57, the selected band of the wavelength of the light to be separated, and other factors, as described above.

The fixed-side bonding surfaces 513, which are the second bonding regions, are formed outside the electrode formation groove 511 in the fixed substrate 51, as described above. Each of the fixed-side bonding surfaces 513 is an optical surface formed in a mirror finishing process and is bonded to the corresponding movable-side bonding surface 523 of the movable substrate 52, which will be described later, in an optical contact process.

The adhesive grooves 514 are formed in the fixed-side bonding surfaces 513 at the four corners of the fixed substrate 51 in the etalon plan view. Each of the adhesive grooves 514 has a shape formed of outer edges 514A parallel to two adjacent outer sides of the fixed substrate 51 and an inner edge 514B, which is a gap-facing edge according to the invention and has a substantially arcuate shape connecting ends of the outer edges 514A.

Specifically, the outer edges 514A of each of the adhesive grooves 514 include outer straight lines 514A1 perpendicular to each other and parallel to two outer sides that form a corner of the fixed substrate 51; and connecting straight lines 514A2, each of which extends from one end of the corresponding outer straight line 514A1 toward the electrode formation groove 511. Each of the outer straight lines 514A1 has a length of 3 mm or any other suitable value, and each of the connecting straight lines 514A2 has a length of 0.5 mm or any other suitable value. The inner edge 514B of each of the adhesive grooves 514 has an arcuate shape connecting ends of the two connecting straight lines 514A2, and the curvature of the inner edge 514B is substantially the same as that of the outer circumferential edge of the electrode formation groove 511.

An air releasing grooves 514C extends from each of the outer straight lines 514A1 toward the periphery of the fixed substrate 51. The air releasing groove 514C allows the corresponding adhesive groove 514 to communicate with the atmosphere when the fixed substrate 51 and the movable substrate 52 are bonded to each other. In the present embodiment, two air releasing grooves 514C are formed for each of the adhesive grooves 514. Alternatively, for example, only one air releasing groove 514C or three or more air releasing grooves 514C may be formed for each of the adhesive grooves 514. When the air releasing grooves 514C are formed at the apexes of the fixed substrate 51, however, the air releasing grooves 514C could cause the fixed substrate 51 and the movable substrate 52 to separate from each other because the apexes of the rectangular shape of the fixed substrate 51 and the movable substrate 52 bonded to each other are inherently portions where the two substrates most likely separate from each other. It is therefore preferable to form each of the fixed-side bonding surfaces 513 in a region including an apex of the rectangular shape of the fixed substrate 51.

An adhesive 515 is applied into the adhesive grooves 514 before the fixed substrate 51 and the movable substrate 52 are bonded to each other. The adhesive 515 can be a thermoset adhesive, an ultraviolet curing adhesive, or any other suitable adhesive. For example, an epoxy-resin-based adhesive, which is a thermoset adhesive, is used in the present embodiment.

The portion of the outer circumferential edge of the electrode formation groove 511 that faces the inner edge 514B of each of the adhesive grooves 514 in the etalon plan view forms a groove-facing peripheral edge 511C according to the invention. Specifically, in the present embodiment, the portion of the outer circumferential edge of the electrode formation groove 511 that is sandwiched between adjacent extension formation grooves 511B is the groove-facing peripheral edge 511C. The region surrounded by the inner edge 514B of each of the adhesive grooves 514, the corresponding groove-facing peripheral edge 511C of the electrode formation groove 511, and the lines connecting both ends of the inner edge 514B and both ends of the groove-facing peripheral edge 511C form an inter-groove-gap region 513A according to the invention.

Each of the warp reduction grooves 516 is formed in the corresponding inter-groove-gap region 513A in a position spaced apart from the center between the inner edge 514B and the groove-facing peripheral edge 511C but close to the adhesive groove 514. More specifically, each of the warp reduction grooves 516 is an arcuate groove whose curvature is substantially the same as that of the corresponding groove-facing peripheral edge 511C of the electrode formation groove 511 and the inner edge 514B of the corresponding adhesive groove 514. The width of the warp reduction groove 516 is, for example, 1 mm. The distance between the outer arc of the warp reduction groove 516 and the inner edge 514B of the adhesive groove 514 is, for example, 0.6 mm. Further, the depth of the warp reduction groove 516 is not limited to a specific value but is, for example, 200 nm, which is equal to the depth of the adhesive groove 514.

The fixed substrate 51 has an anti-reflection (AR) film (not shown) formed on the lower surface, which faces away from the upper surface facing the movable substrate 52, in the position corresponding to the fixed reflection film 56. The anti-reflection film is formed by alternately stacking a low refractive index film and a high refractive index film. The anti-reflection film reduces the reflectance of the surface of the fixed substrate 51 for visible light but increases the transmittance of the surface of the fixed substrate 51 for visible light.

3-1-2. Configuration of Movable Substrate

Figure 5:
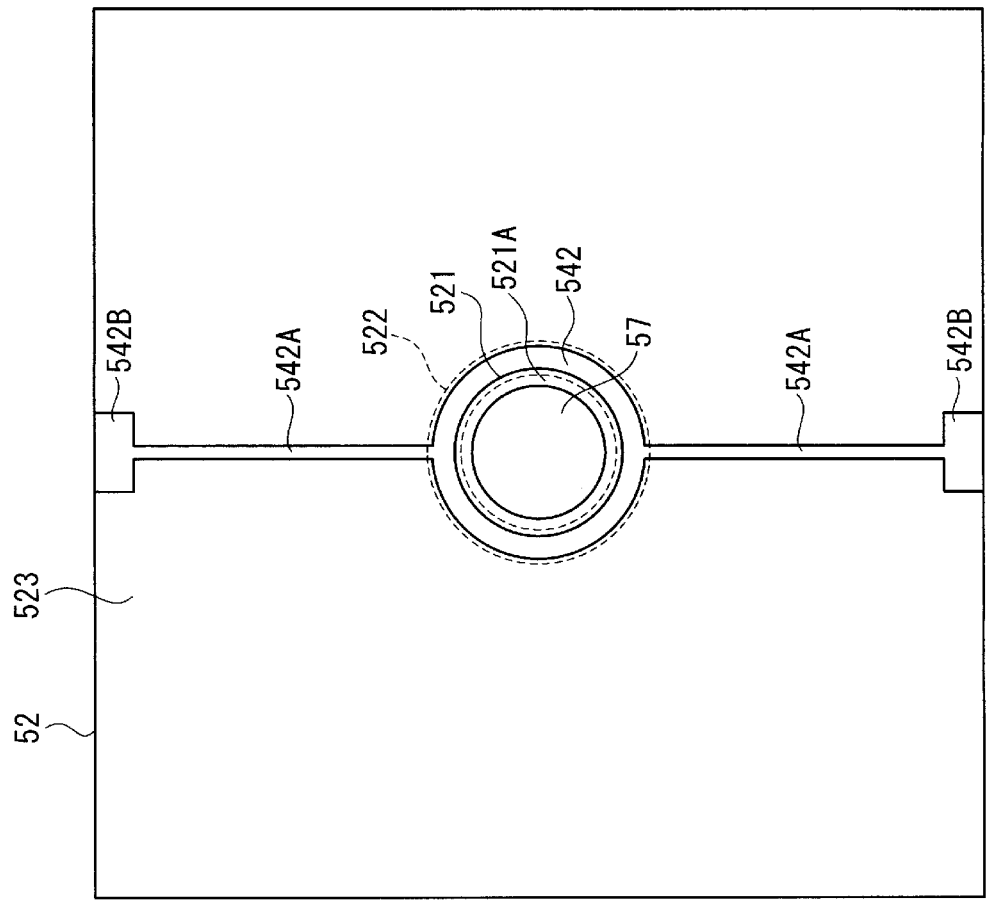
FIG. 5 is a plan view of a movable substrate of the first embodiment and shows the surface thereof that faces the fixed substrate.

The movable substrate 52 is formed by etching a glass base having a thickness of 200 μm or any other suitable value. FIG. 5 is a plan view showing the configuration of the surface of the movable substrate 52 that faces the fixed substrate 51.

Specifically, the movable substrate 52 includes a movable portion 521 having a circular shape around the center of the substrate and a connecting/holding portion 522 coaxial with the movable portion 521 and holding the movable portion 521 in a plan view shown in FIG. 2. The outer diameter of the connecting/holding portion 522 is the same as that of the electrode formation groove 511 in the fixed substrate 51. In the movable substrate 52, the surfaces of the movable portion 521 and the connecting/holding portion 522 that face the fixed substrate 51 are flush with each other and face the electrode formation groove 511 and the reflection film fixing portion 512 in the fixed substrate 51 with an interposed predetermined gap. That is, in the movable substrate 52, the surfaces of the movable portion 521 and the connecting/holding portion 522 that faces the fixed substrate 51 form a first gap formation region according to the invention.

In the region of the movable substrate 52 that face the fixed substrate 51, the region outside the first gap formation region, that is, the surface in the region outside the outer circumferential edge of the connecting/holding portion 522 forms the movable-side bonding surfaces 523, each of which is a first bonding region according to the invention. In the present embodiment, in the movable substrate 52, the movable-side bonding surfaces 523 and the surfaces of the movable portion 521 and the connecting/holding portion 522 that face the fixed substrate 51 are flush with one another and form a mirror-finished optical surface.

The movable-side bonding surfaces 523, the movable portion 521, and the connecting/holding portion 522 are flush with one another in the present embodiment, but the movable portion 521 and the connecting/holding portion 522 may alternatively be shaped into, for example, concave grooves.

The movable portion 521 is thicker than the connecting/holding portion 522. In the present embodiment, the movable portion 521 has, for example, a thickness of 200 μm, which is equal to the thickness of the movable substrate 52. The movable portion 521 includes a movable surface 521A parallel to the reflection film fixing portion 512, and the movable reflection film 57 is fixed onto the movable surface 521A.

The movable reflection film 57 has the same configuration as that of the fixed reflection film 56 described above and is formed of an AgC monolayer reflection film in the present embodiment. The thickness of the AgC monolayer reflection film is, for example, 0.03 μm.

The movable portion 521 has an anti-reflection (AR) film (not shown) on the upper surface, which faces away the movable surface 521A, in the position corresponding to the movable reflection film 57. The anti-reflection film has the same configuration as that of the anti-reflection film formed on the fixed substrate 51 and is formed by alternately stacking a low refractive index film and a high refractive index film.

The connecting/holding portion 522 is a diaphragm surrounding the movable portion 521 and has a thickness of 50 μm or any other suitable value. The movable-side electrode 542 having a ring shape is formed on the surface of the connecting/holding portion 522 that faces the fixed substrate 51. The movable-side electrode 542 faces the fixed-side electrode 541 with a predetermined electromagnetic gap therebetween. The movable-side electrode 542 and the fixed-side electrode 541, which has been described above, form the electrostatic actuator 54, which displaces the movable portion 521.

A pair of movable-side extended electrodes 542A extends outward from part of the outer circumferential edge of the movable-side electrode 542, and a movable-side electrode pad 542B is formed at the tip of each of the movable-side extended electrodes 542A, as shown in FIG. 5. More specifically, in the etalon plan view, the movable-side extended electrodes 542A are formed in the direction perpendicular to the direction in which the fixed-side extended electrodes 541A are formed. In the present embodiment, since the fixed-side extended electrodes 541A are formed along the extension formation grooves 511B formed rightward and leftward in the etalon plan view as shown in FIG. 4, the movable-side extended electrodes 542A are formed on the movable substrate 52 upward and downward in FIG. 5, that is, along the extension formation grooves 511B in which no fixed-side extended electrode 541A is formed. The movable-side electrode pads 542B are also connected to the voltage controller 6, as in the case of the fixed-side electrode pads 541B. To drive the electrostatic actuator 54, a voltage is applied to only one of the pair of movable-side electrode pads 542B. The other one of the movable-side electrode pads 542B is used as a detection terminal for detecting the amount of charge held by the movable-side electrode 542.

3.2 Configuration of Voltage Controller

The voltage controller 6 along with the etalon 5 described above forms the tunable interference filter according to the invention. The voltage controller 6 controls the voltage applied to the fixed-side electrode 541 and the movable-side electrode 542 of the electrostatic actuator 54 based on a control signal inputted from the control apparatus 4.

4. Configuration of Control Apparatus

The control apparatus 4 controls the overall action of the colorimetry module 1.

The control apparatus 4 can, for example, be a general-purpose personal computer, a personal digital assistant, or a computer dedicated to colorimetry.

The control apparatus 4 includes a light source controller 41, a colorimetry sensor controller 42, and a colorimetry processor 43 and the like, as shown in FIG. 1.

The light source controller 41 is connected to the light source apparatus 2. The light source controller 41 outputs a predetermined control signal to the light source apparatus 2 based, for example, on an input set by a user and instructs the light source apparatus 2 to emit white light having predetermined brightness.

The colorimetry sensor controller 42 is connected to the colorimetry sensor 3. The colorimetry sensor controller 42 sets the wavelength of light to be received by the colorimetry sensor 3 based, for example, on an input set by the user and outputs a control signal to the colorimetry sensor 3 to instruct it to detect the amount of received light of the wavelength. In this way, the voltage controller 6 in the colorimetry sensor 3 sets the voltage to be applied to the electrostatic actuator 54 based on the control signal so that only the light of the wavelength desired by the user is transmitted.

5. Method for Manufacturing Etalon

A method for manufacturing the etalon 5 described above will next be described with reference to the drawings.

5-1. Manufacturing Fixed Substrate

Figure 6A:
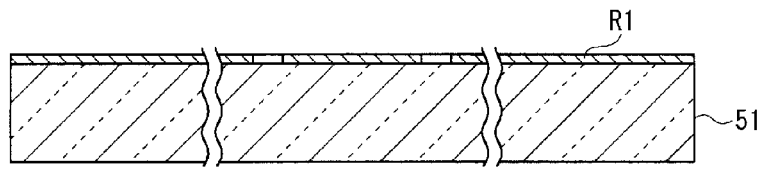
FIGS. 6A to 6F show the steps of manufacturing the fixed substrate of the first embodiment.
Figure 6B:
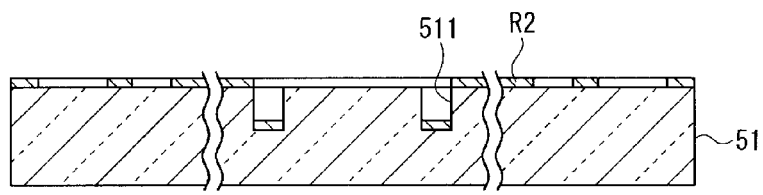
Figure 6C:
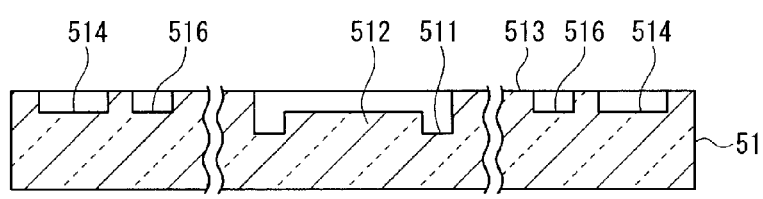
Figure 6D:
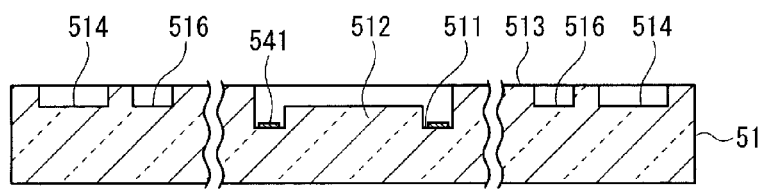
Figure 6E:
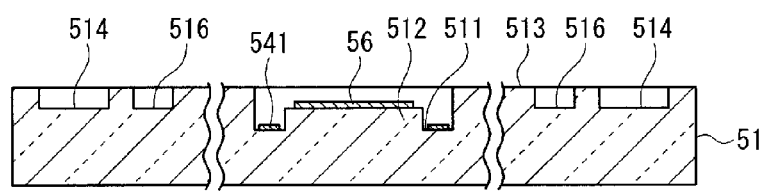
Figure 6F:
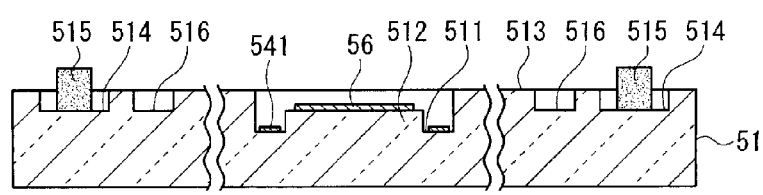

FIGS. 6A to 6F show the steps of manufacturing the fixed substrate 51 of the etalon 5. FIG. 6A is a schematic view showing part of a fixed substrate formation step illustrating a state in which a resist for forming the electrode formation groove is deposited on the fixed substrate 51. FIG. 6B is a schematic view showing another part of the fixed substrate formation step illustrating a state in which a resist for forming the adhesive grooves 514, the warp reduction grooves 516, and the reflection film fixing portion 512 is deposited. FIG. 6C schematically shows the fixed substrate formed in the fixed substrate formation step. FIG. 6D is a schematic view of a fixed-side electrode formation step of forming the fixed-side electrode 541. FIG. 6E is a schematic view of a fixed reflection film formation step of forming the fixed reflection film. FIG. 6F is a schematic view showing an adhesive application step of applying an adhesive into the adhesive grooves 514.

To manufacture the fixed substrate 51, the fixed substrate formation step is first carried out so that the electrode formation groove 511, the reflection film fixing portion 512, the adhesive grooves 514, and the warp reduction grooves 516 are formed by etching a quartz glass base, from which the fixed substrate 51 is manufactured. The quartz glass base has a thickness of 500 μm or any other suitable value and an average surface roughness Ra of 1 nm or smaller obtained by performing in advance mirror finishing on a surface of the quartz glass base.

In the fixed substrate formation step, a resist R1 for forming the electrode formation groove 511 is first formed on the quartz glass base in a photolithography process, as shown in FIG. 6A. That is, the resist R1 is deposited over the entire surface on one side of the quartz glass base for forming the fixed substrate 51, and only the portions of the resist R1 that correspond to the electrode formation groove 511 and the extension formation grooves 511B are irradiated with ultraviolet light or deep ultraviolet light so that the irradiated resist is removed.

Anisotropic etching is then performed on the one side of the quartz glass base to form the electrode formation groove 511 and the extension formation grooves 511B having the same depth of 1 μm or any other suitable value (electrode formation/groove formation step).

After the electrode formation/groove formation step, a resist R2 is formed in the region other than the region corresponding to the reflection film fixing portion 512, the adhesive grooves 514, and the warp reduction grooves 516 in another photolithography process, as shown in FIG. 6B, as in the electrode formation/groove formation step. The adhesive grooves 514, the warp reduction grooves 516, and the reflection film fixing portion 512 having the same depth of 200 nm or any other suitable value are then formed in an etching process, as shown in FIG. 6C.

After the fixed substrate formation step described above, the resist on the fixed substrate 51 is removed, and the fixed-side electrode 541, the fixed-side extended electrodes 541A, and the fixed-side electrode pads 541B are formed in the electrode formation groove 511 and the extension formation grooves 511B, as shown in FIG. 6D (fixed-side electrode formation step). Specifically, in the fixed-side electrode formation step, a Cr/Au layer is deposited, for example, in a sputtering process on the one side of the fixed substrate 51 on which the grooves have been formed in the electrode formation/groove formation step and the fixed substrate formation step in such a way that the Cr/Au layer has a thickness of 10 nm/200 nm. An electrode pattern is then formed in photolithography and etching processes. That is, after a resist corresponding to the shape of the pattern formed of the fixed-side electrode 541, the fixed-side extended electrodes 541A, and the fixed-side electrode pads 541B is formed, the region where no resist has been formed is etched away. The fixed-side electrode 541, the fixed-side extended electrodes 541A, and the fixed-side electrode pads 541B are thus formed.

Further, an AgC layer for forming the fixed reflection film 56 is deposited, for example, in a sputtering process on the entire surface of the fixed substrate 51 on which the electrodes have been formed, and the fixed reflection film 56 having a diameter of 3 mm or any other suitable value is formed on the reflection film fixing portion 512 in photolithography and etching processes, as in the fixed-side electrode formation step, as shown in FIG. 6E (fixed reflection film formation step).

Thereafter, the adhesive 515 is applied into the adhesive grooves 514 (adhesive application step), as shown in FIG. 6F. A method for applying an adhesive in the adhesive application step is not limited to a specific method, and a film transfer method, a squeezing method, a dispensing method, or any other suitable method is used to apply an adhesive.

5-2. Manufacturing Movable Substrate

A method for manufacturing the movable substrate 52 will next be described.

Figure 7A:
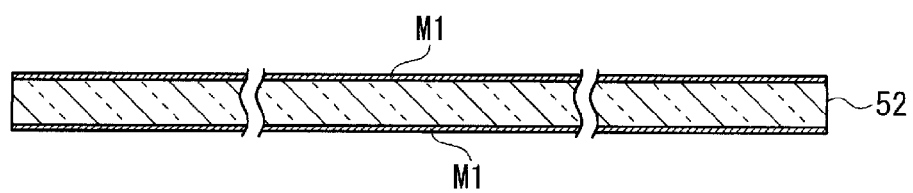
FIGS. 7A to 7D show the steps of manufacturing the movable substrate of the first embodiment.
Figure 7B:
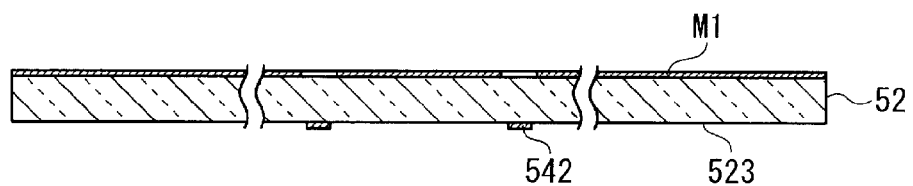
Figure 7C:
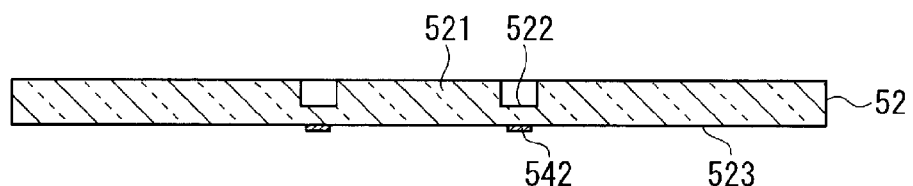
Figure 7D:
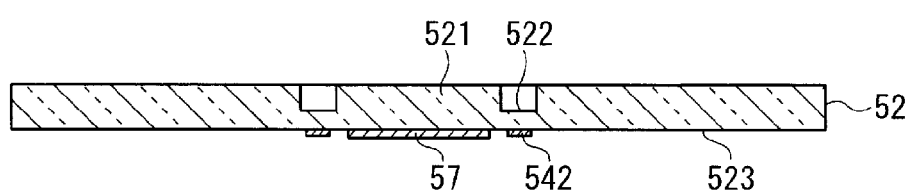

FIGS. 7A to 7D are cross-sectional views schematically showing the steps of manufacturing the first substrate. FIG. 7A is a schematic view showing a conductive film formation step of depositing a conductive film on the movable substrate 52. FIG. 7B shows an electrode formation step of shaping the conductive film on the movable substrate 52 in a photolithography process. FIG. 7C is a schematic view showing a movable substrate formation step of forming the movable portion 521 and the connecting/holding portion 522. FIG. 7D is a schematic view showing a movable reflection film formation step of forming the movable reflection film 57.

To form the movable substrate 52, a quartz glass base, of which the movable substrate 52 is made and which has a thickness of 200 nm or any other suitable value, is first processed in a mirror finishing process to achieve an average surface roughness Ra of 1 nm or smaller. A conductive film M1 for forming the movable-side electrode 542 is deposited over the entire surface of the movable substrate 52, as shown in FIG. 7A. As the conductive film M1, a Cr/Au layer or any other suitable layer is formed to a thickness of 10 nm/200 nm, as in the case of the fixed-side electrode 541.

The conductive film M1 is then shaped into a pattern having a predetermined shape in photolithography and etching processes, as shown in FIG. 7B. Specifically, on one side of the movable substrate 52 (the side that does not face the fixed substrate 51), only the conductive film M1 in the region where the connecting/holding portion 522 will be formed is removed, and on the other side of the movable substrate 52 (the side that faces the fixed substrate 51), the conductive film in the region other than the position where the movable-side electrode 542, the movable-side extended electrodes 542A, and the movable-side electrode pads 542B will be formed is removed.

Thereafter, the resultant conductive film is used as an etching mask to perform anisotropic etching on the one side of the movable substrate 52 (the side that does not face the fixed substrate 51) to a depth of 150 μm or any other suitable value. The connecting/holding portion 522 and the movable portion 521 are thus formed, as shown in FIG. 7C. After the etching, the conductive film M1 on the side of the movable substrate 52 that does not face the fixed substrate 51 is removed.

Thereafter, the movable reflection film 57 is formed on the side of the movable substrate 52 that faces the fixed substrate 51 in the movable reflection film formation step, as shown in FIG. 7D. In the movable reflection film formation step, the movable reflection film 57 is formed in the same manner as in the fixed reflection film formation step. That is, an AgC layer for forming the movable reflection film 57 is deposited over the entire surface on the side of the movable substrate 52 that faces the fixed substrate 51, for example, in a sputtering process, and the movable reflection film 57 having a diameter of 3 mm or any other suitable value is formed on the movable portion 521 in photolithography and etching processes.

5-3. Manufacturing Etalon

A description will next be made of how to manufacture the etalon 5 using the thus manufactured fixed substrate 51 and movable substrate 52.

FIGS. 8A to 8C show the steps of manufacturing the etalon 5. FIG. 8A is a schematic view showing a bonding step. FIG. 8B is a schematic view showing part of the etalon after the adhesive 515 hardens. FIG. 8C is a schematic view showing part of the etalon when no warp reduction groove 516 is formed.

The etalon 5 is manufactured by bonding the thus manufactured fixed substrate 51 and movable substrate 52 to each other.

In this process, the optical surfaces of the fixed-side bonding surfaces 513 and the optical surfaces of the movable-side bonding surfaces 523 are bonded to each other in an optical contact process by abutting the fixed-side bonding surfaces 513 and the movable-side bonding surfaces 523 each other and applying a load along the thickness direction of the substrates. That is, the fixed substrate 51 and the movable substrate 52 come into intimate contact with each other, and the reflection film fixing surface 512A of the fixed substrate 51 and the movable surface 521A of the movable substrate 52 are maintained parallel to each other.

Since the fixed substrate 51 is further adhesively bonded to the movable substrate 52 with the adhesive 515 having been applied into the adhesive grooves 514, the fixed substrate 51 and the movable substrate 52 will not separate but high bonding strength is achieved.

When adhesive bonding is achieved by the adhesive 515 having been applied into the adhesive grooves 514 as described above, shrinkage of the adhesive 515 when it hardens may cause the portions of the movable substrate 52 that face the adhesive grooves 514 to warp into the adhesive grooves 514 in some cases.

When the movable substrate 52 warps toward the adhesive grooves 514, a reaction force against the warp toward the adhesive grooves 514 (hereinafter referred to as a warp reaction force) is produced in the region from the position facing the inner edge 514B of each of the adhesive grooves 514 in the fixed substrate 51 to the connecting/holding portion 522, which forms the gap formation region.

The warp reaction force decreases with distance from the adhesive groove 514. If no warp reduction groove 516 is formed in the fixed substrate 51 as shown in FIG. 8C, however, the magnitude of the warp reaction force will not sufficiently decrease but will be transferred to the connecting/holding portion 522. In this case, the connecting/holding portion 522 may warp due to the warp reaction force in some cases.

In contrast, the warp reduction grooves 516 are formed in the fixed substrate 51 between the adhesive grooves 514 and the electrode formation groove 511 in the present embodiment. In this case, even when the movable substrate 52 warps into the adhesive grooves 514, the movable substrate 52 also warps in the warp reduction grooves 516 so that the warp reaction force is released, as shown in FIG. 8B. That is, since the movable substrate 52 warps into the warp reduction grooves 516, the warp reaction force can be decreased and hence the warp reaction force transferred to the connecting/holding portion 522 decrease, whereby the connecting/holding portion 522 will not warp. As a result, the movable surface 521A and the reflection film fixing surface 512A can be maintained parallel to each other, and hence the pair of reflection films 56 and 57 can be maintained parallel to each other.

On the other hand, when the movable substrate 52 warps into the warp reduction grooves 516, a reaction force against the warp is produced, although the reaction force is smaller than the warp reaction force produced when the movable substrate 52 warps into the adhesive grooves 514. To address the problem, in the present embodiment, each of the warp reduction grooves 516 is formed in a position spaced apart from the center between the inner edge 514B of the corresponding adhesive groove 514 and the corresponding groove-facing peripheral edge 511C but close to the adhesive groove 514. Therefore, the warp reduction grooves 516 can sufficiently reduce the reaction force produced when the movable substrate 52 warps into the warp reduction grooves 516 and can reduce the warp reaction force transferred to the connecting/holding portion 522 more reliably.

Further, when the movable substrate 52 warps into the adhesive grooves 514, a warp reaction force against the warp is produced in the region from the position facing the inner edge 514B of each of the adhesive grooves 514 to the connecting/holding portion 522, as described above. In consideration of this fact, the inner edge 514B of each of the adhesive grooves 514 has the same curvature as that of the corresponding groove-facing peripheral edge 511C, which is part of the outer circumferential edge of the electrode formation groove 511. Further, the connecting/holding portion 522 has the same shape as that of the electrode formation groove 511 in the etalon plan view, and each of the warp reduction grooves 516 has an arcuate shape having the same curvature as that of the inner edge 514B of the corresponding adhesive groove 514. As a result, the warp reaction force transferred from each of the inner edges 514B will uniformly decrease. For example, no large warp reaction force will inconveniently act on only part of the peripheral edge of the connecting/holding portion 522 that faces the groove-facing peripheral edges 511C.

6. Advantageous Effects in First Embodiment

As described above, in the etalon 5, which forms the colorimetry sensor 3 in the colorimetry module 1 of the first embodiment, the adhesive groove 514 is formed in each of the fixed-side bonding surfaces 513 of the fixed substrate 51, and the warp reduction groove 516 is formed between the adhesive groove 514 and the electrode formation groove 511. The etalon 5 is formed by abutting the fixed-side bonding surfaces 513 of the fixed substrate 51 and the movable-side bonding surfaces 523 of the movable substrate 52 and adhesively bonding the fixed substrate 51 and the movable substrate 52 to each other with the adhesive 515 applied into the adhesive grooves 514.

In this configuration, when the fixed substrate 51 and the movable substrate 52 are bonded to each other, shrinkage of the adhesive 515 when it hardens causes the movable substrate 52 to warp into the adhesive grooves 514. Even when the warp produces a warp reaction force in the movable substrate 52, the warp reduction grooves 516 can release the warp reaction force. The warp reaction force transferred to the connecting/holding portion 522 will therefore effectively decrease, as compared with a configuration in which no warp reduction groove 516 is formed. It is therefore possible to prevent the connecting/holding portion 522 from warping. As a result, the movable surface 521A of the movable portion 521 and the reflection film fixing surface 512A of the reflection film fixing portion 512 of the fixed substrate 51 can be maintained parallel to each other, whereby the movable reflection film 57 formed on the movable surface 521A and the fixed reflection film 56 formed on the reflection film fixing surface 512A can also be maintained parallel to each other. Therefore, the light passing through the etalon 5 can be limited to the light of a desired wavelength, whereby the spectral precision can be improved.

Further, since the colorimetry sensor 3 can acquire the amount of light separated by the etalon 5, which excels in spectral precision as described above, the colorimetry sensor can accurately measure the amount of separated light.

Moreover, the colorimetry module 1 performs colorimetry based on the amount of light measured by the colorimetry sensor described above. It is therefore possible to accurately analyze the chromaticity of the object to be inspected A based on the amount of each separated light component having been accurately measured, and it is hence possible to perform accurate colorimetric measurement.

The fixed-side bonding surfaces 513 and the movable-side bonding surfaces 523 are formed to be mirror-finished optical surfaces and bonded to each other in an optical contact process.

As a result, the fixed substrate 51 and the movable substrate 52, which come into intimate contact with each other in an optical contact process, can be maintained parallel to each other with precision. Although the bonding strength obtained only by the optical contact or only by the adhesive bonding with the adhesive 515 is not sufficient, the bonding strength can be increased by using both the optical contact and the adhesive bonding with the adhesive 515 as described above.

The warp reduction grooves 516 are formed in the inter-groove-gap regions 513A between the inner edges 514B of the adhesive grooves 514 and the groove-facing peripheral edges 511C of the electrode formation groove 511, and each of the warp reduction grooves 516 is spaced apart from the center between the corresponding inner edge 514B and groove-facing peripheral edge 511C but close to the corresponding adhesive groove 514.

The distance between the position in the movable substrate 52 that faces each of the warp reduction grooves 516 and the connecting/holding portion 522 can therefore be sufficiently large, whereby a reaction force produced when the movable substrate 52 warps into the warp reduction grooves 516 is unlikely transferred to the connecting/holding portion 522. It is therefore possible to prevent the connecting/holding portion 522 from warping more effectively, whereby the pair of reflection films 56 and 57 can be maintained parallel to each other more reliably.

Further, the adhesive grooves 514 and the warp reduction grooves 516 are formed in the vicinities of the four corners of the fixed substrate 51.

That is, the adhesive grooves 514 and the warp reduction grooves 516 are formed in positions remote from the electrode formation groove 511. As a result, a warp reaction force produced when the movable substrate 52 warps into the adhesive grooves 514 is unlikely transferred to the connecting/holding portion 522. It is therefore possible to prevent the connecting/holding portion 522 from warping more reliably.

Further, the inner edges 514B of the adhesive grooves 514 and the warp reduction grooves 516 have the same curvature as that of the groove-facing peripheral edges 511C of the electrode formation groove 511. As a result, a warp reaction force produced when the movable substrate 52 warps into the adhesive grooves 514 is uniformly transferred to the groove-facing peripheral edges 511C. Although the warp reduction grooves 516 sufficiently reduce the warp reaction force as described above, the balance of stress acting on the connecting/holding portion 522 may not be stable in some cases if the warp reaction force acting on the regions of the movable substrate 52 that face the groove-facing peripheral edges 511C is not uniform but large stress acts on only part of the groove-facing peripheral edges 511C. In contrast, stress acts uniformly on the connecting/holding portion 522 and hence the balance of the stress is stable in the embodiment described above, as described above. It is therefore possible to prevent the connecting/holding portion 522 from warping more reliably.

Further, the adhesive grooves 514 communicate with the atmosphere outside the etalon 5 via the air releasing grooves 514C. As a result, when the fixed substrate 51 and the movable substrate 52 are bonded to each other, and even when shrinkage of the adhesive 515 when it hardens causes the movable substrate 52 to warp into the adhesive grooves 514, the pressure in the adhesive grooves 514 will not increase. It is therefore possible to prevent the fixed-side bonding surfaces 513 and the movable-side bonding surfaces 523 from separating due to an increase in pressure in the adhesive grooves 514.

Second Embodiment

A colorimetry module of a second embodiment according to the invention will next be described.

The colorimetry module of the second embodiment differs from the colorimetry module 1 of the first embodiment only in terms of the shape of the warp reduction grooves 516 in the etalon 5. Only the configuration of the fixed substrate of the etalon will be described.

Figure 9:
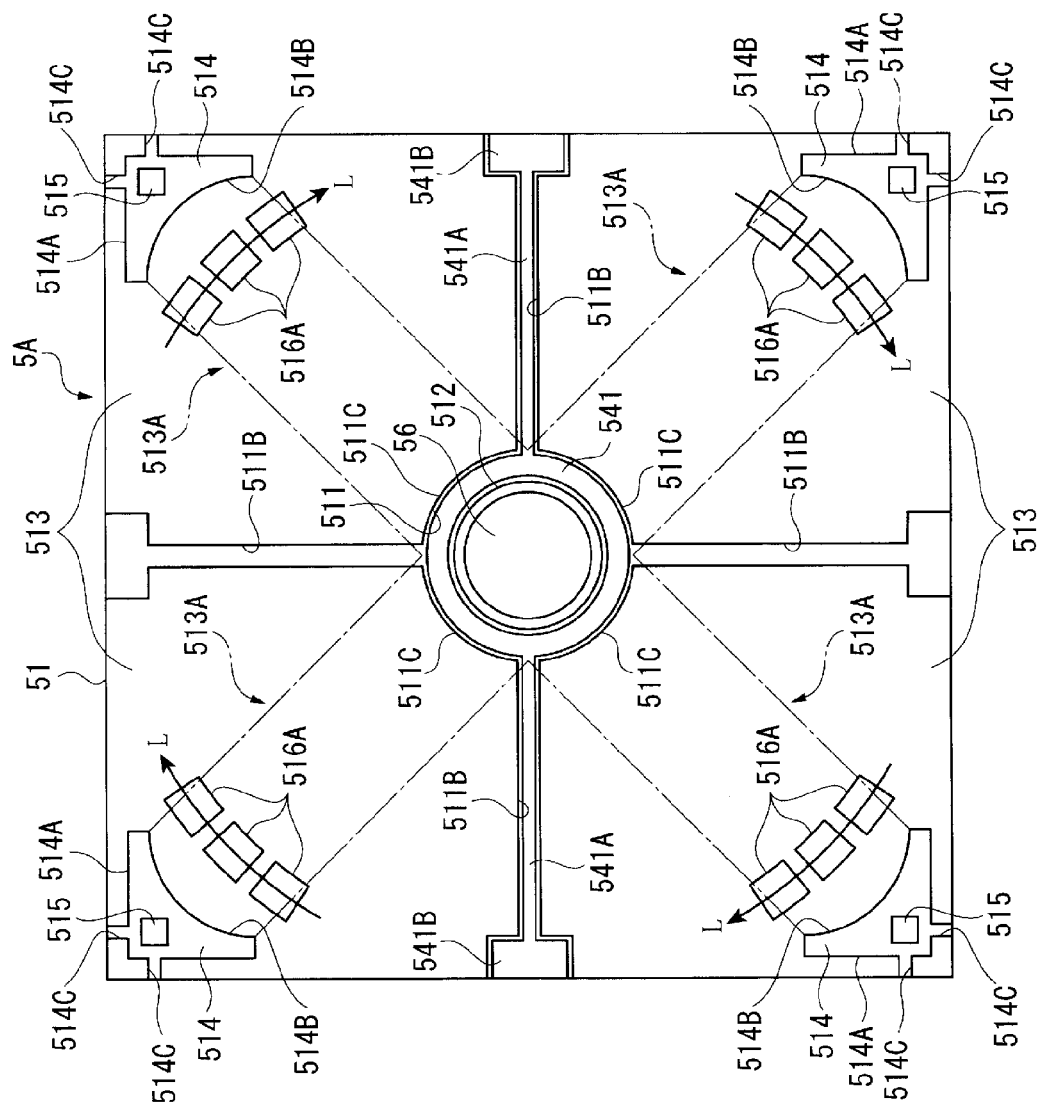
FIG. 9 is a plan view showing a fixed substrate of an etalon of a second embodiment.

FIG. 9 is a plan view showing the fixed substrate 51 of an etalon 5A of the second embodiment. In the following description, the same components as those in the first embodiment have the same reference characters, and descriptions of these components will be omitted or simplified.

As shown in FIG. 9, in the etalon 5A of the second embodiment, each warp reduction groove 516A has a substantially rectangular shape in the etalon plan view, and a plurality of warp reduction grooves 516A are provided along a curve L that substantially follows the inner edge 514B of each of the adhesive grooves 514. The distance between the warp reduction grooves 516A is not limited to a specific value but may be any value as long as in each of the inter-groove-gap regions 513A, the sum of the dimensions of the warp reduction grooves 516A along the curve L, which substantially follows the corresponding inner edge 514B, is larger than the sum of the dimensions of the portions where no warp reduction groove 516A is formed. Therefore, for example, when the dimension of a single warp reduction groove 516A along the curve substantially following the inner edge is small, a plurality of warp reduction grooves 516A may be formed at a high density. The shape of each of the warp reduction grooves 516A is not limited to rectangular in a plan view but may, for example, be circular or elliptical in a plan view.

Advantageous Effects in Second Embodiment

In the etalon 5A of the second embodiment described above, a plurality of warp reduction grooves 516A are formed in the fixed substrate 51 along the inner edges of the adhesive grooves 514.

Forming the warp reduction grooves 516A of this type also allows a warp reaction force produced when shrinkage of the hardened adhesive 515 causes the movable substrate 52 to warp into the adhesive grooves 514 to be effectively released via the warp reduction grooves 516A, as in the first embodiment described above. It is therefore possible to prevent the connecting/holding portion 522 from warping.

Further, although the configuration in which a plurality of warp reduction grooves 516A are formed causes a decrease in efficiency at which the magnitude of a warp reaction force is reduced, as compared with a case where each of the warp reduction grooves 516 extends along the corresponding inner edge 514B as in the first embodiment, a sufficiently advantageous effect that prevents the connecting/holding portion 522 from warping is provided. In addition to this, extra fixed-side bonding surfaces 513 are formed between the warp reduction grooves 516A, whereby the area of the fixed substrate 51 to be bonded to the movable substrate 52 in an optical contact process increases and the bonding strength further increases accordingly.

Other Embodiments

The invention is not limited to the embodiments described above. Variations, modifications, and other changes to the extent that they can achieve the object of the invention fall within the scope of the invention.

Figure 10A:
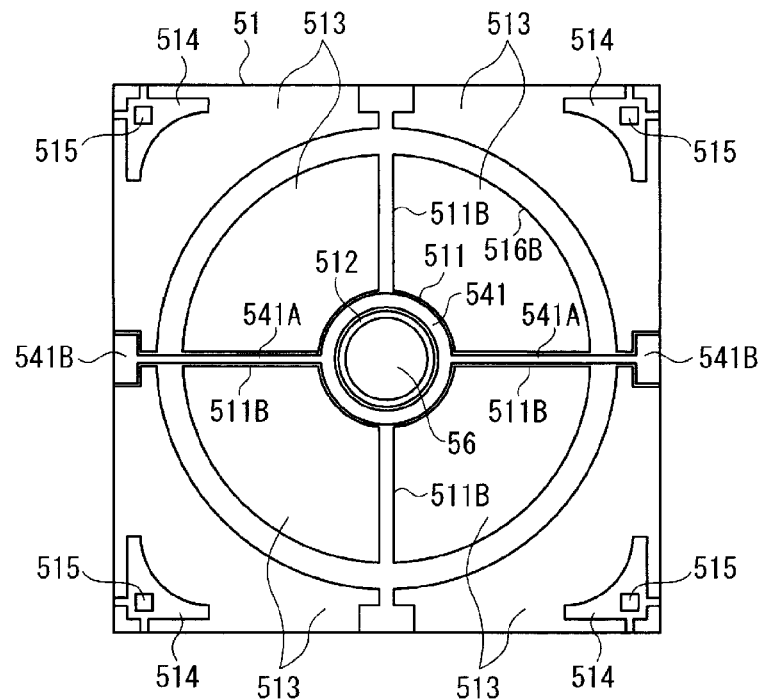
FIGS. 10A and 10B are plan views showing fixed substrates of etalons in other embodiments.
Figure 10B:
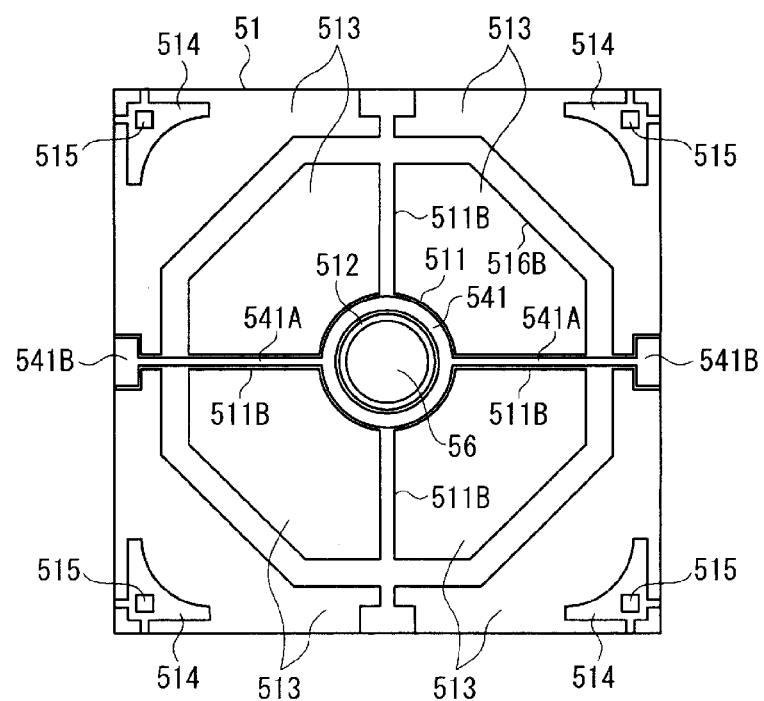

The first and second embodiments have been described with reference to the case where the warp reduction grooves 516 and 516A are formed in the inter-groove-gap regions 513A of the fixed substrate 51. For example, an annular warp reduction groove 516B may alternatively be formed in the fixed substrate 51, as shown in FIGS. 10A and 10B. In this case, the warp reduction groove 516B may have a circularly annular shape, as shown in FIG. 10A, or may have a polygonal shape, as shown in FIG. 10B.

The inner edges 514B of the adhesive grooves 514 and the warp reduction grooves 516 do not necessarily have the same curvature as that of the groove-facing peripheral edges 511C of the electrode formation groove 511. For example, the inner edges 514B of the adhesive grooves 514 and the warp reduction grooves 516 may have arcuate shapes concentric with the outer circumferential edge of the electrode formation groove 511 or may have linear shapes.

Further, in the embodiments described above, the adhesive grooves 514 are formed at the four corners of the fixed substrate 51 having a square shape. For example, the shape of the fixed substrate 51 in a plan view may have other shapes. In this case, to prevent the movable substrate 52 from warping when the adhesive hardens and shrinks, the adhesive grooves 514 are formed in the fixed substrate 51 in the positions most remote from the electrode formation groove 511, which is the second gap formation region.

In the embodiments described above, the etalon 5 or 5A is presented as the interference filter according to the invention by way of example, and the electrostatic actuator 54 displaces the movable portion 521 so that the gap between the reflection films can be adjusted to change the wavelength of transmitted light, but the invention is not limited to the configuration described above. For example, the interference filter according to the invention can also be used as a spectroscopic filter that transmits only light of a given wavelength that has been set in advance. In this case, it is unnecessary to not only provide the electrostatic actuator 54 but also form the grooves for forming the connecting/holding portion 522 and the movable portion 521 in the movable substrate 52.

Further, the above embodiments have been described with reference to the case where the fixed-side bonding surfaces 513 and the movable-side bonding surfaces 523 are bonded to each other in what is called optical contact (room-temperature activation), in which the fixed-side bonding surfaces 513 and the movable-side bonding surfaces 523 are activated into optical surfaces and a load is applied to the overlaid bonding surfaces 513 and 523, but the invention is not limited to the case described above. For example, a metal film may alternatively be formed uniformly on one of the bonding surfaces, and the bonding surfaces 513 and 523 may be bonded to each other in an anodic bonding process.

Moreover, an epoxy-resin-based adhesive, which is a thermoset adhesive, is presented as the adhesive 515 by way of example, but the adhesive 515 is not limited thereto. For example, an ultraviolet curing adhesive may be used, as described above.

Further, in the embodiments described above, the fixed substrate 51 and the movable substrate 52 are adhesively bonded to each other at the four corners thereof. For example, a single adhesive groove 514 may alternatively be formed along the outer sides of the fixed substrate 51, and the fixed substrate 51 may be adhesively bonded to the movable substrate 52. In this case, the extended electrodes 541A and 542A of the electrodes 541 and 542, which form the electrostatic actuator 54, may extend from the center of the etalon 5 or 5A toward the four corners, and the electrode pads 541B and 542B may be formed at the corners of the etalon 5 or 5A.

Moreover, in the embodiments described above, the fixed substrate 51 is the second substrate according to the invention and the movable substrate 52 is the first substrate according to the invention, and the adhesive grooves 514 and the warp reduction grooves 516 are formed in the fixed substrate 51. The movable substrate 52 is made thinner than the fixed substrate 51 in order to displace the movable portion 521 of the movable substrate 52 along the thickness direction of the substrates and in consideration of manufacturability of the movable portion 521 and the connecting/holding portion 522. The adhesive grooves 514 and the warp reduction grooves 516 are formed in the fixed substrate 51 in order to effectively prevent the thus configured movable substrate 52 from warping. On the other hand, for example, in an interference filter that separates only light of a given wavelength that has been set in advance without adjusting the gap between the reflection films described above, the fixed substrate 51 and the movable substrate 52 may have the same thickness or the fixed substrate 51 may be thinner than the movable substrate 52 in some cases. In this case, for example, the movable substrate 52 may be the second substrate according to the invention, and the adhesive grooves 514 and the warp reduction grooves 516 may be formed in the movable substrate 52.

Further, the adhesive grooves 514 may be formed both in the fixed substrate 51 and the movable substrate 52 in such a way that the adhesive grooves 514 face each other, and the fixed substrate 51 and the movable substrate 52 may be adhesively bonded to each other with an adhesive applied into the adhesive grooves 514. In this case, the warp reduction grooves 516 may be formed both in the fixed substrate 51 and the movable substrate 52.

In the embodiments described above, the colorimetry sensor 3 is presented as the optical sensor according to the invention and the colorimetry module 1 including the colorimetry sensor 3 is presented as the optical module according to the invention by way of example, but the invention is not limited to the embodiments described above. For example, the optical sensor according to the invention may alternatively be a gas sensor into which a gas flows and light is incident and which detects light absorbed by the gas, and the optical module according to the invention may be a gas detecting apparatus that uses the gas sensor to analyze and identify the gas flowing into the sensor.

Additionally, the specific configuration and procedure for implementing the invention can be changed to other configuration and procedure as appropriate to the extent that the changes can still achieve the object of the invention.

What is claimed is:

1. An interference filter comprising:
   a first substrate;
   a second substrate that faces one side of the first substrate and is bonded to the first substrate;
   a first reflection film formed on the one side of the first substrate that faces the second substrate; and
   a second reflection film provided on the second substrate and faces the first reflection film,
   the first substrate including
   a first gap formation region in which the first reflection film is disposed and which is not contact with the second substrate, and
   a first bonding region provided outside the first gap formation region and in contact with the second substrate,
   the second substrate including
   a second gap formation region in which the second reflection film is disposed and which faces the first gap formation region with a gap therebetween,
   a second bonding region provided outside the second gap formation region and in contact with the first bonding region of the first substrate,
   adhesive grooves which are formed in the second bonding region and into which an adhesive is applied, and warp reduction grooves formed between the adhesive grooves and the second gap formation region, and wherein the first substrate and the second substrate are adhesively bonded to each other with the adhesive applied into the adhesive grooves with the first bonding region and the second bonding region bonded to each other.

2. The interference filter according to claim 1, wherein the first bonding region and the second bonding region are optical surfaces, and the first substrate and the second substrate are not only bonded to each other by optical contact between the first bonding region and the second bonding region but also adhesively bonded with the adhesive applied into the adhesive grooves.

3. The interference filter according to claim 1, wherein each of the warp reduction grooves is disposed in a position spaced apart from a center between a gap-facing peripheral edge and a groove-facing peripheral edge but close to a corresponding one of the adhesive grooves, the gap-facing peripheral edge being a portion of the peripheral edge of the adhesive groove that faces the second gap formation region, and the groove-facing peripheral edge being a portion of the peripheral edge of the second gap formation region that faces the adhesive groove.

4. The interference filter according to claim 1, wherein each of the warp reduction grooves is disposed in an inter-groove-gap region surrounded by a gap-facing peripheral edge, which is a portion of the peripheral edge of a corresponding adhesive groove that faces the second gap formation region, and a groove-facing peripheral edge, which is a portion of the peripheral edge of the second gap formation region that faces the adhesive groove.

5. The interference filter according to claim 4, wherein the warp reduction groove in each of the inter-groove-gap regions includes a plurality of warp reduction grooves along a corresponding gap-facing peripheral edge.

6. The interference filter according to claim 1, wherein each of the first substrate and the second substrate has a rectangular shape in a plan view, and the adhesive grooves and the warp reduction grooves are formed in a vicinity of the four corners of a rectangular shape of the second substrate.

7. An optical sensor comprising:

the interference filter according to claim 1; and a light receiver for receiving light separated by the interference filter.

8. An optical module comprising:

the optical sensor according to claim 7; and a processor for analyzing light separated by the interference filter based on an amount of light received by the light receiver.

* * * * *